(12) United States Patent
Seitz

(10) Patent No.: US 11,529,903 B2
(45) Date of Patent: Dec. 20, 2022

(54) LOAD BAR GUIDE AND STOP BRACKET FOR A TRUCK TRAILER

(71) Applicant: Strick Trailers, LLC, Fairless Hills, PA (US)

(72) Inventor: Kevin Seitz, Decatur, IN (US)

(73) Assignee: Strick Trailers, LLC, Fairless Hills, PA (US)

( * ) Notice: Subject to any disclaimer, the term of this patent is extended or adjusted under 35 U.S.C. 154(b) by 180 days.

(21) Appl. No.: 17/181,002

(22) Filed: Feb. 22, 2021

(65) Prior Publication Data

US 2021/0261043 A1      Aug. 26, 2021

Related U.S. Application Data

(60) Provisional application No. 62/980,161, filed on Feb. 22, 2020.

(51) Int. Cl.
| | | |
|---|---|---|
| *B60P 7/15* | (2006.01) | |
| *B62D 63/08* | (2006.01) | |
| *B62D 33/04* | (2006.01) | |
| *B60P 1/64* | (2006.01) | |
| *B62D 25/02* | (2006.01) | |
| *B60J 5/10* | (2006.01) | |
| *E05D 3/02* | (2006.01) | |
| *B60P 3/07* | (2006.01) | |
| *B60Q 1/50* | (2006.01) | |
| *B60P 1/44* | (2006.01) | |
| *B60P 1/00* | (2006.01) | |

(52) U.S. Cl.
CPC .............. *B60P 7/15* (2013.01); *B60J 5/108* (2013.01); *B60P 1/00* (2013.01); *B60P 1/4464* (2013.01); *B60P 1/6409* (2013.01); *B60P 3/07* (2013.01); *B60Q 1/50* (2013.01); *B62D 25/02* (2013.01); *B62D 33/04* (2013.01); *B62D 33/046* (2013.01); *B62D 63/08* (2013.01); *E05D 3/02* (2013.01); *E05Y 2900/516* (2013.01); *E05Y 2900/531* (2013.01)

(58) Field of Classification Search
CPC ..... E05D 3/02; B60Q 1/50; B60P 1/00; B60P 7/15; B62D 33/04
USPC .......................................................... 410/143
See application file for complete search history.

(56) References Cited

U.S. PATENT DOCUMENTS

| | | | | |
|---|---|---|---|---|
| 4,145,849 | A * | 3/1979 | Shindoll ................ | A47B 96/00 211/119.003 |
| 5,338,137 | A * | 8/1994 | Jensen ................ | B61D 45/001 211/187 |
| 6,739,811 | B1 * | 5/2004 | Petelka ..................... | B60P 1/00 410/144 |
| 9,505,337 | B1 * | 11/2016 | Squyres ............... | B61D 45/002 |

(Continued)

*Primary Examiner* — D Glenn Dayoan
*Assistant Examiner* — Sunsurraye Westbrook
(74) *Attorney, Agent, or Firm* — Barrett McNagny LLP; George Pappas

(57) ABSTRACT

A transportation vessel includes a sidewall having a vertically oriented track on an interior side of the sidewall. The track extends upwardly to a top of the sidewall. A load bar has end(s) coupled to the track such that the end of the load bar is vertically slidable along the track. A stop bracket is positioned at a top of the track. The stop bracket includes a track extension and a stop piece. The track extension accommodates sliding of the load bar upwardly above the track. The stop piece blocks upward sliding of the load bar above the track extension.

18 Claims, 5 Drawing Sheets

(56) References Cited

U.S. PATENT DOCUMENTS

2016/0082875 A1\* 3/2016 Squyres .................... B60P 7/14
410/129
2018/0050630 A1\* 2/2018 Kauffman .......... B65D 90/0053

\* cited by examiner

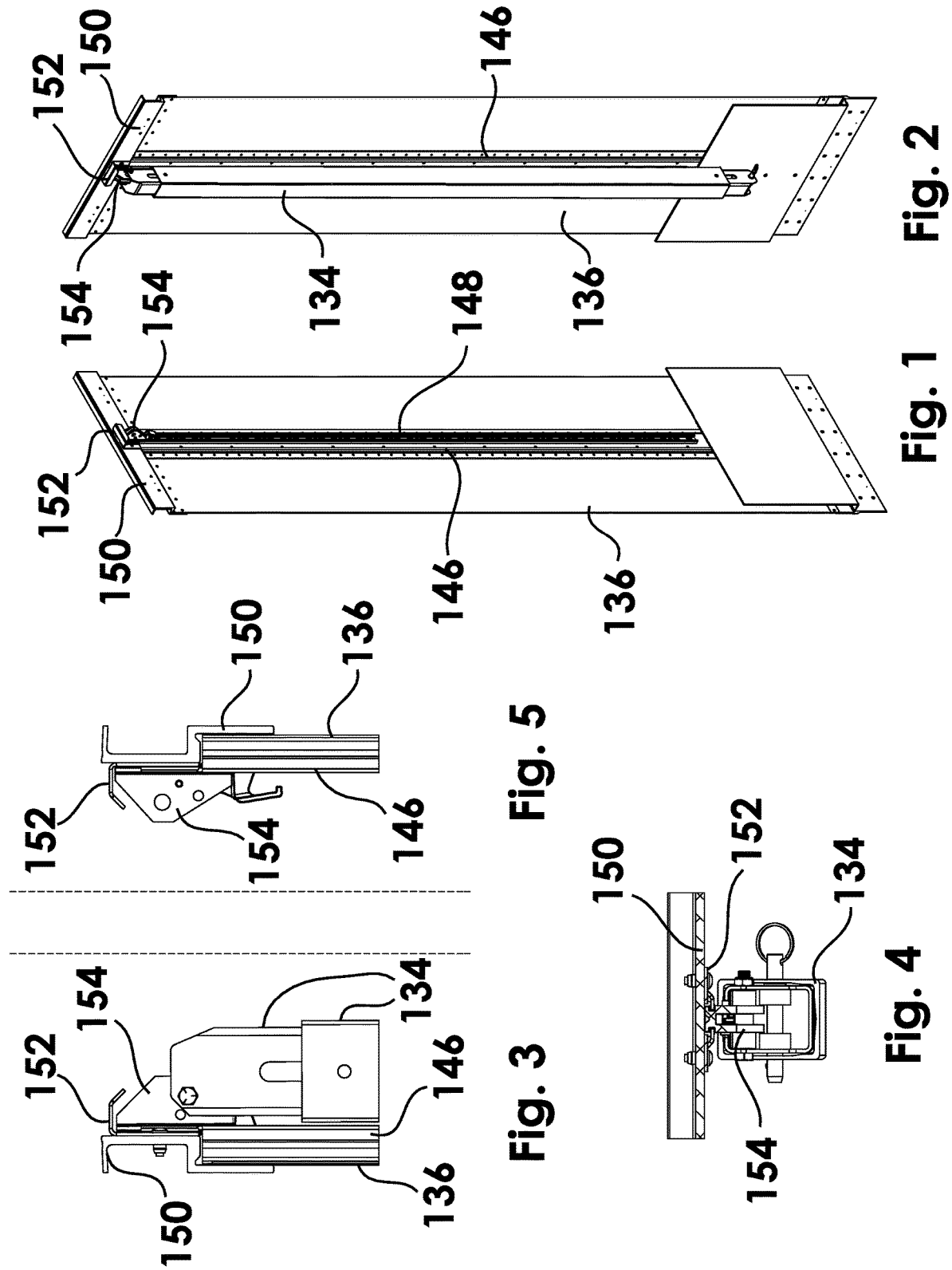

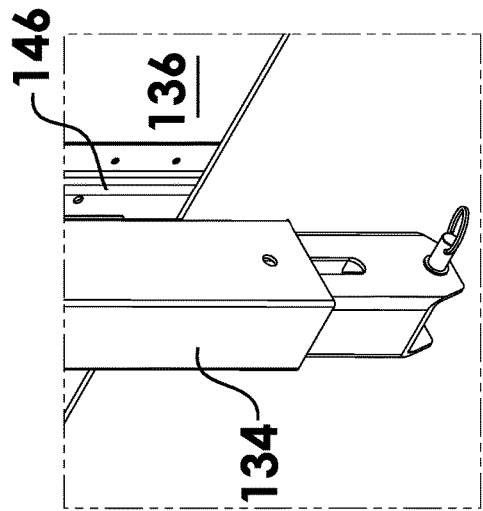
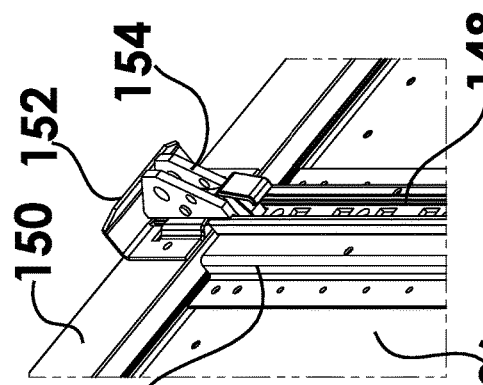
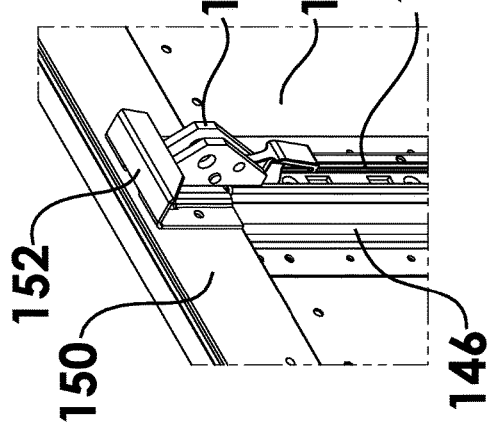
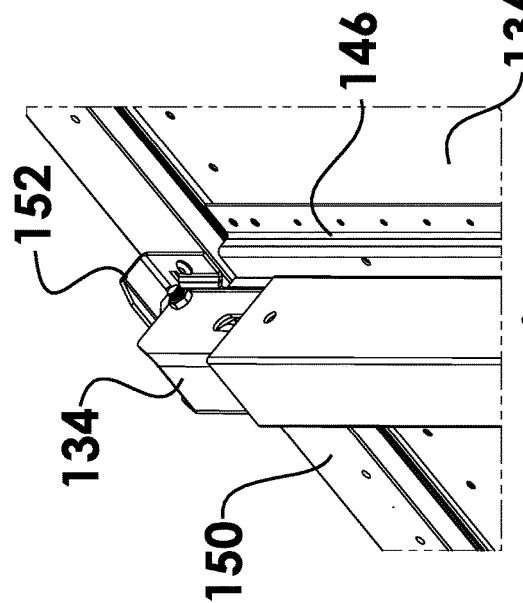
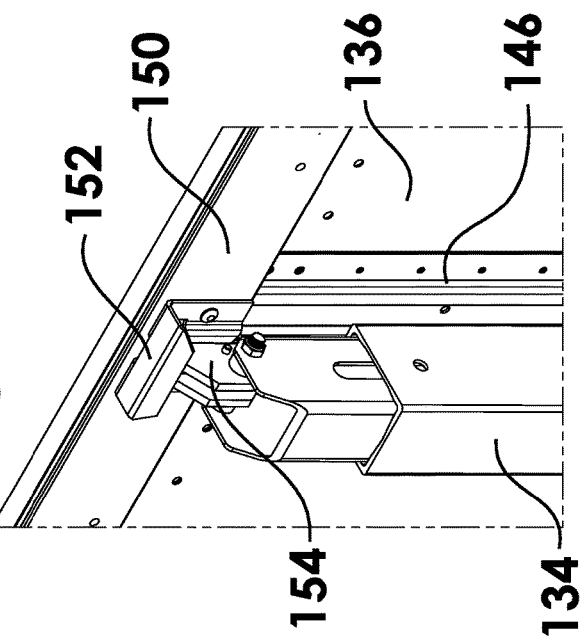

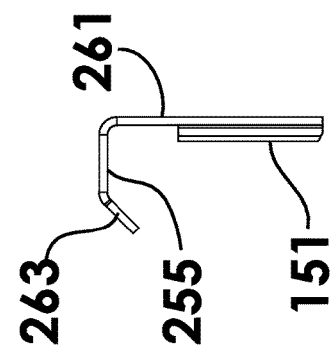
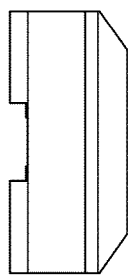
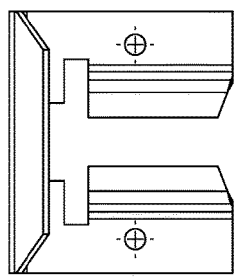
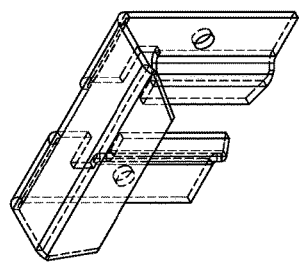
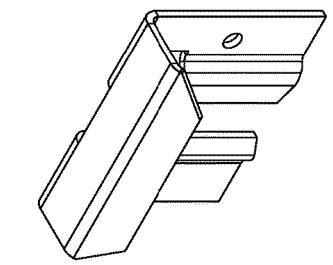
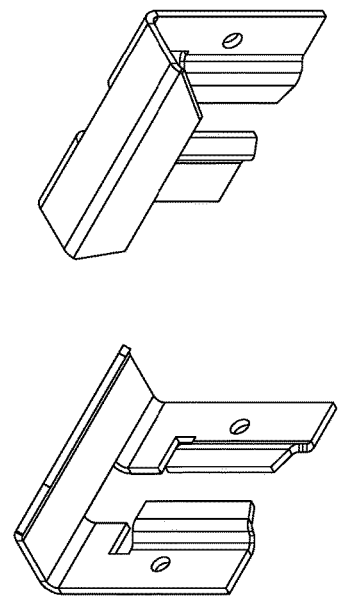
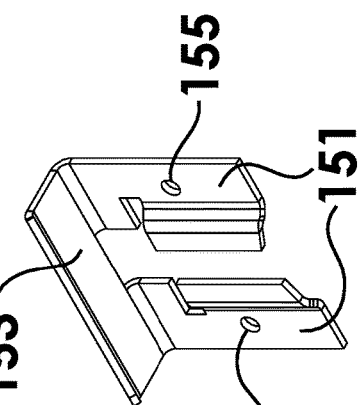
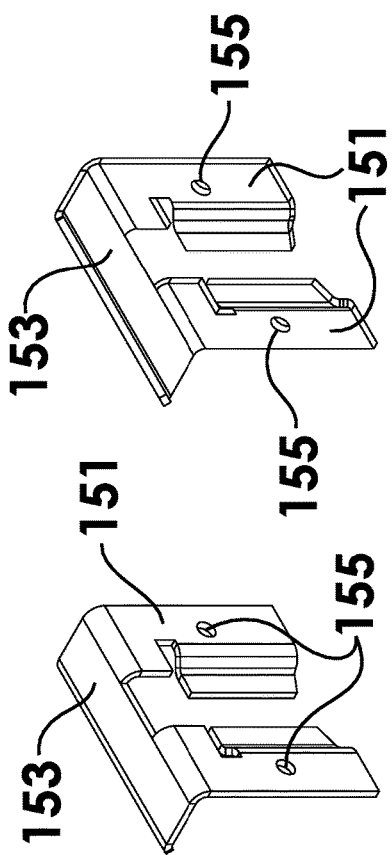

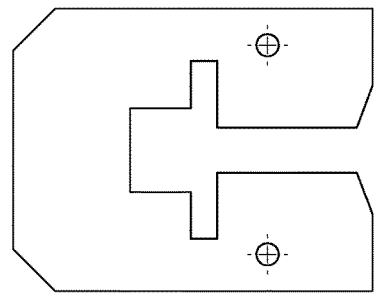
Fig. 26
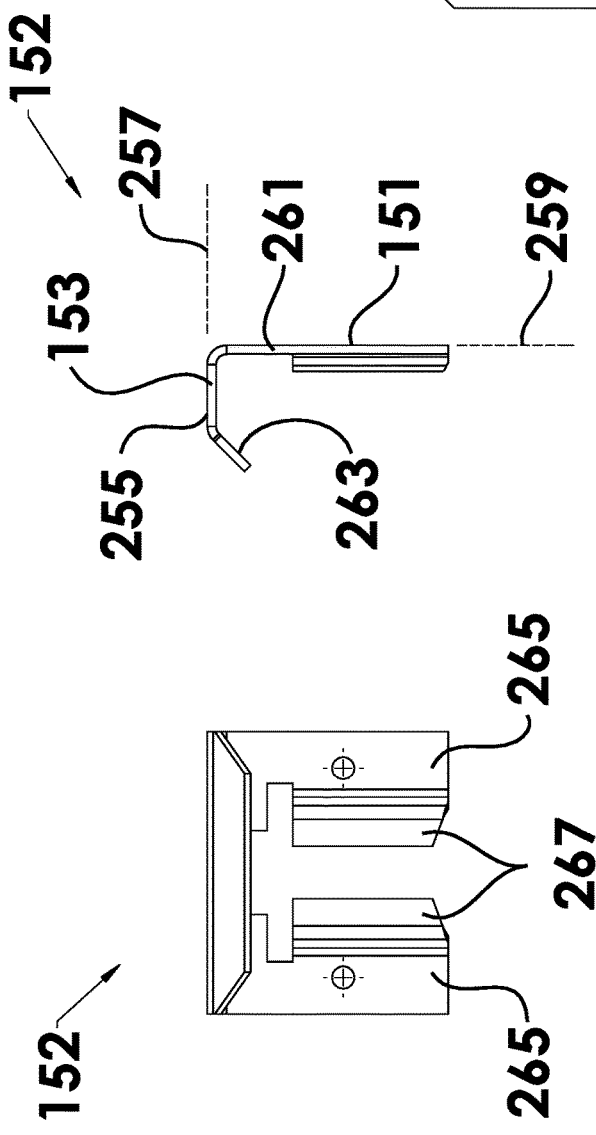
Fig. 24
Fig. 23
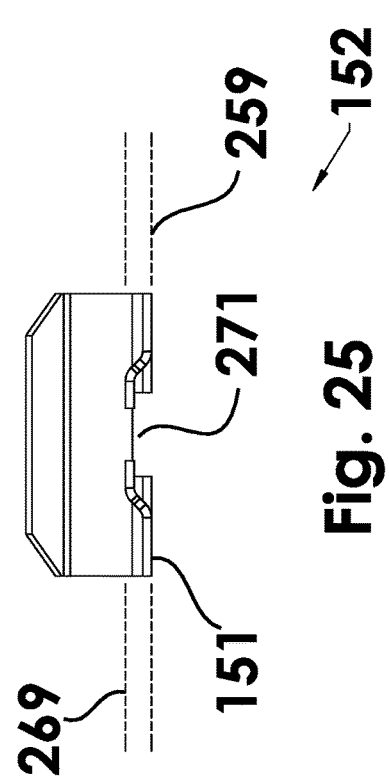
Fig. 25

LOAD BAR GUIDE AND STOP BRACKET FOR A TRUCK TRAILER

CROSS-REFERENCED TO RELATED APPLICATIONS

This application claims benefit of U.S. Provisional Application No. 62/980,161 filed on Feb. 22, 2020, the disclosure of which is hereby incorporated by reference in its entirety for all purposes.

SUMMARY

In one embodiment, a plurality of load bars extend horizontally between, and are attachable to, the sidewalls of the trailer or truck body. A subset of the load bars are at a same vertical level such that they can support a platform (e.g., a pallet) that supports cargo. One end of the load bar is releasably attached to one sidewall, and the other end of the load bar is pivotably attached to the opposite sidewall. When the load bar is at a high enough level, the releasably attached end may be freed from the sidewall and swung down such that the bar is vertically oriented in a position parallel to and adjacent the opposite sidewall. In this vertical position, the bar is out of the way for maximum clear opening height for loading cargo. The ability to store the load bar in a vertical position adjacent a trailer sidewall enables the load bar to be used in any area of the interior of a trailer. In one embodiment, the pivotable end of the load bar is pivotably attached to a slidable piece that slides vertically in a track in a vertical post in the sidewall. The track includes notches at various vertical positions along the track in which the slidable piece can be latched and thus secured at a certain vertical level. The post and the track extend upwardly to the top of the sidewall and end at the bottom of the top rail of the trailer or truck body or container. A track extension or guide is attached to the top rail to effectively extend the track upwardly beyond the sidewall. The track extension retains the slidable piece and enables a top portion of the slidable piece to slide upwardly past the track to a position where a bottom portion of the slidable piece can be latched in a topmost notch in the vertical track. The track extension may include a stop that limits the upward sliding movement of the slidable piece and the load bar in the track extension, thereby preventing the slidable piece and the load bar from sliding upwardly beyond the track extension and becoming detached from the sidewall. The stop portion of the track extension protects the roof sheet from damage caused by the slidable piece or end clip portion of the load bar.

The invention comprises, in a further form thereof, a trailer, container or truck body including a first sidewall and an opposing second sidewall. A load bar has a first end and a second end. The load bar is movable between a horizontal orientation and a vertical orientation. In the horizontal orientation, the first end is attached to the first sidewall and the second end is attached to the second sidewall, and the load bar may support cargo while the cargo is being transported in the trailer, container or truck body. In the vertical orientation, the first end is attached to the first sidewall and the second end is unattached to the second sidewall.

The invention comprises, in still another form thereof, a trailer, container, or truck body including a sidewall having a vertically oriented track on an interior side of the sidewall. The track extends upwardly to a top of the sidewall. A load bar has an end coupled to the track such that the end of the load bar is vertically slidable along the track. A stop bracket is positioned at a top of the track. The stop bracket includes a track extension and a stop piece. The track extension accommodates sliding of the load bar upwardly above the track. The stop piece blocks upward sliding of the load bar above the track extension.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a left overhead fragmentary perspective view of the interior side of a sidewall of a trailer of the present invention;

FIG. 2 is a right overhead fragmentary perspective view of the interior side of the sidewall of a trailer of the present invention;

FIG. 3 is a left side view of an upper end of the post and load bar of FIG. 2;

FIG. 4 is an overhead view of the load bar guide and stop bracket (LBGSB), slidable piece, and load bar of FIG. 3;

FIG. 5 is a right-side view of an upper end of the post of FIG. 1;

FIG. 10 is an enlarged right-side overhead perspective view of the joint between the load bar and post of FIG. 2;

FIG. 11 is another enlarged right side underside perspective view of the joint between the load bar and post of FIG. 2, at a more upward angle that in FIG. 10;

FIG. 12 is an enlarged left side overhead perspective view of the upper end of the post of FIG. 1;

FIG. 13 is an enlarged left side underside perspective view of the upper end of the post of FIG. 1;

FIG. 14 is a right-side overhead perspective view of a lower end of the post and load bar of FIG. 2;

FIG. 15 is a rear right side overhead view of the load bar guide and stop bracket;

FIG. 16 is a front right-side underside view of the load bar guide and stop bracket;

FIG. 17 is a rear left side underside view of the load bar guide and stop bracket;

FIG. 18 is a front right-side overhead view of the load bar guide and stop bracket;

FIG. 19 is a transparent front right-side overhead view of the load bar guide and stop bracket;

FIG. 20 is a front plan view of the load bar guide and stop bracket;

FIG. 21 is a right-side view of the load bar guide and stop bracket;

FIG. 22 is an overhead view of the load bar guide and stop bracket;

FIG. 23 is another front plan view of the load bar guide and stop bracket;

FIG. 24 is another right-side view of the load bar guide and stop bracket;

FIG. 25 is an underside view of the load bar guide and stop bracket;

FIG. 26 is a front view of a blank from which the load bar guide and stop bracket can be formed.

Figure 8:
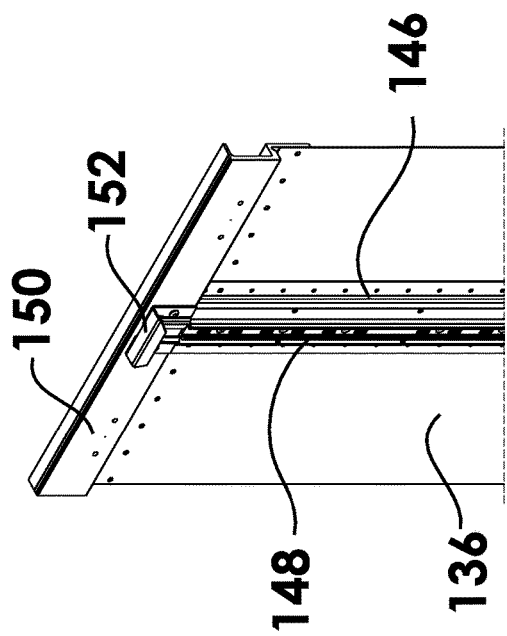
FIG. 8 is an enlarged right-side underside fragmentary perspective view of the joint between the load bar and post of FIG. 6.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

FIG. 1 illustrates a portion of the interior side of a trailer sidewall 136 including a vertical post 146. Post 146 includes a central track 148 that ends at a top rail 150. A load bar guide and stop bracket (LBGSB) 152 is attached to top rail 150 and functions as an extension of track 148. A slidable piece 154 slidably rides within track 148.

FIG. 2 illustrates the interior side of sidewall 136 with a load bar 134 attached, and with load bar 134 in a vertical position. Slidable piece 154 is pivotably attached to load bar 134 and thus couples load bar 134 to post 146. LBGSB 152 may prevent load bar 134 and slidable piece 154 from running into a roof sheet and keep slidable piece 154 and load bar 134 in line with and engaged with the captive beam track 148 below top rail 150.

FIG. 3 illustrates an upper end of post 146 and load bar 134.

FIG. 4 illustrates LBGSB 152, slidable piece 154, and load bar 134.

FIG. 5 illustrates an upper end of post 146 and sidewall 136, including top rail 150, load bar guide and stop bracket (LBGSB) 152 and slidable piece 154.

Figure 6:
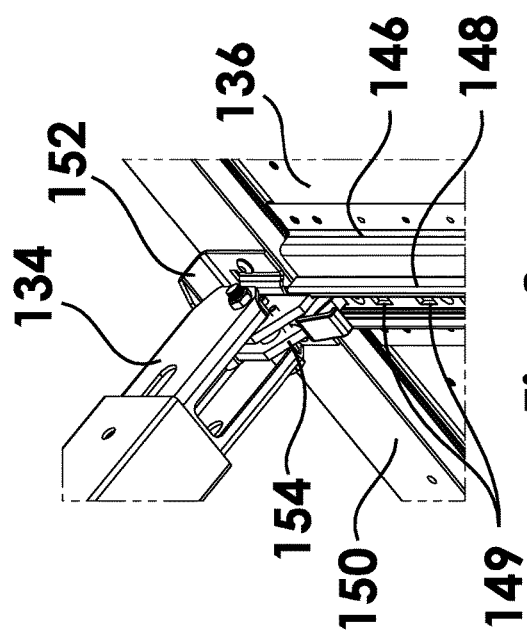
FIG. 6 is a right side overhead fragmentary perspective view of the interior side of the sidewall of FIG. 2 with a load bar attached and in a horizontal, load-bearing position.

FIG. 6 illustrates the interior side of sidewall 136 with a load bar 134 attached and pivoted into a horizontal, load-bearing position.

Figure 7:
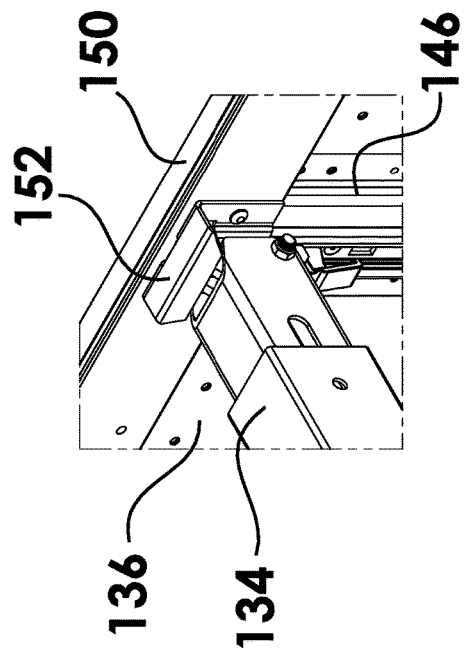
FIG. 7 is an enlarged right-side overhead perspective view of the joint between the load bar and post of FIG. 6.

FIGS. 7 and 8 are enlarged illustrations of the joint between load bar 134 and post 146. FIG. 8 is an enlarged right-side underside fragmentary perspective view of the joint between the load bar and post of FIG. 6. Track 148 includes notches 149 aligned along the height of posts 146. Slidable piece 154 may be partially inserted within a notch 149 such that load bar 134 may be vertically supported by the notch 149. When two slidable pieces 154 on respective opposite ends of a load bar 134 are inserted into respective notches 149 that are at the same vertical level on opposing posts 146, the load bar 134 may be supported by posts 146 and fixed in a horizontal orientation.

Figure 9:
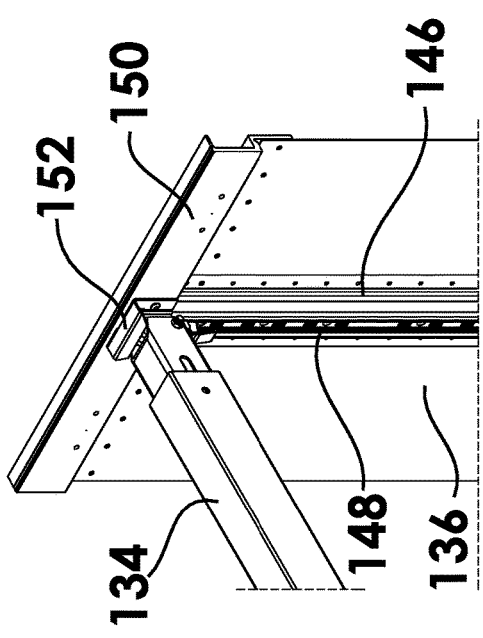
FIG. 9 is a right side overhead fragmentary perspective view of the interior side of the sidewall of FIG. 2 without a load bar.

FIG. 9 illustrates the interior side of the sidewall 136 and top rail 150 including post 146 and LBGSB 152.

FIGS. 10 and 11 are illustrations of the joint between load bar 134 and post 146 with load bar 134 in a vertical position.

FIGS. 12 and 13 are enlarged illustrations of the upper end of post 146, top rail 150, slidable piece 154 and LBGSB 152.

FIG. 14 illustrates a lower end of post 146 and load bar 134, with load bar 134 in the vertical position and the lower end of load bar 134 being unattached to the left sidewall. Although the load bars have been described herein as being attached to right sidewall 136 and unattached to the left sidewall, it should be understood that this is only an example, and the load bar may also be unattached to right sidewall 136 and attached to the left sidewall or permanently affixed to both within the scope of the invention.

FIGS. 15-26 are various illustrations of LBGSB 152, including a track extension portion 151 and a stop portion 153. Track extension portion 151 includes throughholes 155 through which LBGSB 152 may be screwed or bolted to top rail 150. Stop portion 153 may block the further upward sliding motion of both load bar 134 and slidable piece 154. Stop portion 153 includes a horizontal portion 255 that defines a plane 257 (FIG. 24). A body 261 of track extension portion 151 defines a plane 259 (FIG. 24) that is oriented at an angle of 90 degrees relative to plane 257. Stop portion 153 includes a downward slanting portion 263 that is oriented at an angle of about 45 degrees relative to plane 257. In the event that load bar 134 and slidable piece 154 hits horizontal portion 255 with an upward force sufficient to bend horizontal portion 255 upwardly, slanting portion 263 may still retain load bar 134 and slidable piece 154 and prevent load bar 134 and slidable piece 154 from damaging roof sheet 108.

Body 261 of track extension portion 151 includes two parallel opposing body portions 265 (FIG. 23). Extending from a respective inner edge of each body portion 265 are two cantilever legs 267 that define a plane 269 (FIG. 25) that is parallel to plane 259. Cantilever legs 267 and top rail 150 define therebetween a channel 271 in which load bar 134 and slidable piece 154 may be received and retained. Channel 271 may be in communication with and aligned with track 148.

The invention may be applied to a trailer, container or truck body. Trailers, containers or truck bodies may be conjunctively referred to herein as "transportation vessels".

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A transportation vessel, comprising:
a sidewall including a vertically oriented track on an interior side of the sidewall, the track extending upwardly to a top of the sidewall;
a load bar having an end coupled to the track such that the end of the load bar is vertically slidable along the track; and
a stop bracket positioned at a top of the track, the stop bracket including a track extension and a stop piece, the track extension being configured to accommodate sliding of the load bar upwardly above the track, the stop piece being configured to block upward sliding of the load bar above the track extension.

2. The transportation vessel of claim 1, further comprising a horizontally-oriented top rail disposed above the sidewall, the stop bracket being attached to the top rail.

3. The transportation vessel of claim 1, wherein the track extension defines a first imaginary plane, and the stop piece defines a second imaginary plane, the second imaginary plane being oriented at an angle of about 90 degrees relative to the first imaginary plane.

4. The transportation vessel of claim 1, wherein the stop piece extends in an interior direction from an upper end of the track extension, the interior direction being a direction away from the sidewall.

5. The transportation vessel of claim 4, wherein the stop piece includes:
  a horizontal portion including a first end and a second end, the first end being attached to the upper end of the track extension; and
  a downward slanted portion including a proximal end and a distal end, the proximal end being attached to the second end of the horizontal portion.

6. The transportation vessel of claim 1, wherein the track extension includes:
  a body having two planar opposing body portions defining a first imaginary plane; and two cantilever legs extending from a respective inner edge of each said body portion.

7. The transportation vessel of claim 6, further comprising:
  a slidable piece pivotably attached to the load bar and received in the track; and
  a horizontally-oriented top rail disposed above the sidewall, the stop bracket being attached to the top rail, wherein the cantilever legs define a second imaginary plane that is parallel to the first imaginary plane, the cantilever legs and the top rail defining therebetween a channel in which the slidable piece can be received and retained.

8. The transportation vessel of claim 7, wherein the channel is in communication with and aligned with the track.

9. A transportation vessel, comprising:
  a sidewall including a vertically oriented track on an interior side of the sidewall, the track extending upwardly to a top of the sidewall, the track being configured to slidably retain an end of a load bar; and
  a stop bracket positioned at a top of the track, the stop bracket including a track extension and a stop piece, the track extension being configured to accommodate sliding of the load bar upwardly above the track, the stop piece being configured to block upward sliding of the load bar above the track extension.

10. The transportation vessel of claim 9, further comprising a horizontally-oriented top rail disposed above the sidewall, the stop bracket being attached to the top rail.

11. The transportation vessel of claim 9, wherein the track extension defines a first imaginary plane, and the stop piece defines a second imaginary plane, the second imaginary plane being oriented at an angle of about 90 degrees relative to the first imaginary plane.

12. The transportation vessel of claim 9, wherein the stop piece extends in an interior direction from an upper end of the track extension, the interior direction being a direction away from the sidewall.

13. The transportation vessel of claim 12, wherein the stop piece includes:
  a horizontal portion including a first end and a second end, the first end being attached to the upper end of the track extension; and
  a downward slanted portion including a proximal end and a distal end, the proximal end being attached to the second end of the horizontal portion.

14. The transportation vessel of claim 9, wherein the track extension includes:
  a body having two planar opposing body portions defining a first imaginary plane; and two cantilever legs extending from a respective inner edge of each said body portion.

15. The transportation vessel of claim 14, further comprising a horizontally-oriented top rail disposed above the sidewall, the stop bracket being attached to the top rail, wherein the cantilever legs define a second imaginary plane that is parallel to the first imaginary plane, the cantilever legs and the top rail defining there between a channel configured to receive and retain the end of the load bar.

16. The transportation vessel of claim 15, wherein the channel is in communication with and aligned with the track.

17. A transportation vessel, comprising:
  a sidewall including a vertically oriented track on an interior side of the sidewall, the track extending upwardly to a top of the sidewall;
  a load bar having an end coupled to the track such that the end of the load bar is vertically slidable along the track; and
  a stop bracket positioned at a top of the track, the stop bracket being configured to accommodate upward sliding of the load bar a certain distance above the track, and block upward sliding of the load bar beyond the certain distance.

18. The transportation vessel of claim 17, further comprising a horizontally-oriented top rail disposed above the sidewall, the stop bracket being attached to the top rail, the stop rail and the top rail defining a channel there between, the channel being in communication with and aligned with the track.

* * * * *